(12) United States Patent
Zhu et al.

(10) Patent No.: US 11,240,503 B2
(45) Date of Patent: Feb. 1, 2022

(54) METHOD FOR OPTIMIZING TWO-PASS CODING

(71) Applicant: University of Electronic Science and Technology of China, Chengdu (CN)

(72) Inventors: Ce Zhu, Chengdu (CN); Hongwei Guo, Chengdu (CN); Yuyang Liu, Chengdu (CN); Mao Ye, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 0 days.

(21) Appl. No.: 17/117,142

(22) Filed: Dec. 10, 2020

(65) Prior Publication Data
US 2021/0185318 A1    Jun. 17, 2021

(30) Foreign Application Priority Data
Dec. 16, 2019    (CN) .......................... 201911292705.4

(51) Int. Cl.
*H04N 19/124*    (2014.01)
*H04N 19/147*    (2014.01)
(Continued)

(52) U.S. Cl.
CPC ......... *H04N 19/124* (2014.11); *H04N 19/147* (2014.11); *H04N 19/177* (2014.11); *H04N 19/52* (2014.11)

(58) Field of Classification Search
CPC .. H04N 19/124; H04N 19/147; H04N 19/177; H04N 19/52; H04N 19/19; H04N 19/172
See application file for complete search history.

(56) References Cited

U.S. PATENT DOCUMENTS

| 7,916,783 B2 * | 3/2011 | Gao ....................... H04N 19/19 |
| | | 375/240.03 |
| 10,674,158 B2 * | 6/2020 | Carmel ................ H04N 19/103 |

(Continued)

OTHER PUBLICATIONS

• Enqing Chen et al., (hereinafter Chen) "Advances in Multimedia Information Processing" PCM 2016, China, Sep. 2016, Part II reveal a widely used QP minimization at p. 572 (Year: 2016).*

(Continued)

*Primary Examiner* — Dramos Kalapodas
(74) *Attorney, Agent, or Firm* — Bayramoglu Law Offices LLC

(57) ABSTRACT

A method for optimizing a second coding is provided. The method includes: Setting a quantization parameter of a start frame of a video sequence according to a range of an input quantization parameter $QP_0$ of a coder; performing first coding with a simplified method, and calculating a frame-level temporal impact factor $k_i$ of a current frame and a block-level temporal impact factor $k_{B,j}$ of all 16×16 pixel blocks in the current frame; restoring reference list information of the coder after the first coding is completed, and then determining whether a scene is switched; and performing the second coding by setting quantization parameters with different strategies according to whether the scene is switched.

1 Claim, 3 Drawing Sheets

(51) Int. Cl.
    *H04N 19/177*     (2014.01)
    *H04N 19/52*     (2014.01)

(56) References Cited

U.S. PATENT DOCUMENTS

| | | | | |
|---|---|---|---|---|
| 10,999,576 | B2* | 5/2021 | Huang | H04N 19/137 |
| 2018/0376153 | A1* | 12/2018 | Gokhale | H04N 19/137 |
| 2020/0275103 | A1* | 8/2020 | Zhao | H04N 19/174 |
| 2020/0275104 | A1* | 8/2020 | Zhao | H04N 19/174 |

OTHER PUBLICATIONS

He et al., "Adaptive Quantization Parameter Selection for H.265/HEVC by Employing Inter-Frame Dependency"; 1051-8215 (C) 2017 IEEE (Year: 2017).*

Feng et al., "A Two-Layer Real-Time Rate Control Algorithm Based on Lagrange Optimum Algorithm"; ID: 1007-1202(2009), Wuhan University, 2009 vol. 14 No. 1 (Year: 2019).*

Jiang et al., : "On Lagrange Multiplier and Quantizer Adjustment for H.264 Frame-Layer Video Rate Control"; 2006 (c) IEEE ID: 10.1109/TCSVT.2006.873159 (Year: 2006).*

Guo et al.,: "Optimal Adaptive Quantizing in Low Bit Rate Video Coding"; International Symposium on intelligent Signal Processing and Comm. Systems, Hong-Kong Dec. 13-16, 2005 (Year: 2005).*

Li et al., ; "QP Refinement According To Lagrange Multiplier for HEVC", 2013 (c) IEEE, 978-1-4673-5762-3/13 (Year: 2013).*

Kuo et al.,:"Rate Control via Adjustment of Lagrange Multiplier for Video Coding"; Nov. 2016 (c) IEEE, (Year : 2016).*

\* cited by examiner

| Sequence | $\Delta EncT$ | | BD-Rate (%) | |
| --- | --- | --- | --- | --- |
| | LDB | LDP | LDB | LDP |
| Class B | 24% | 24% | -4.2 | -4.4 |
| Class C | 24% | 25% | -4.4 | -4.3 |
| Class D | 22% | 23% | -2.7 | -2.9 |
| Class E | 20% | 21% | -11.1 | -11.8 |
| Class F | 22% | 23% | -5.0 | -5.0 |
| Total average | 23% | 23% | -5.1 | -5.3 |

FIG. 6

METHOD FOR OPTIMIZING TWO-PASS CODING

CROSS REFERENCE TO THE RELATED APPLICATIONS

This application is based upon and claims priority to Chinese Patent Application No. 201911292705.4, filed on Dec. 16, 2019, the entire contents of which are incorporated herein by reference.

TECHNICAL FIELD

The present invention relates to a field of coding technologies, and in particular to a method for optimizing two-pass coding.

BACKGROUND

With the rapid development of electronic information technologies and the use of various video data collection methods, digital video has become a main carrier of multimedia information. However, the amount of uncompressed digital video data is tremendous, for example, for an 8-bit RGB color video with a resolution of 1920×1080 and a frame rate of 30 Hz, the amount of data per hour is as high as 4.89 TB. Such a large amount of data brings great challenges to the transmission and storage of videos. Therefore, since the 1980s, video compression technologies have continued to become a hot field of research and application at home and abroad. With the development of digital video codec technologies, the application of digital videos covers various fields such as TV broadcasting, digital movies, remote education, remote medicine, video surveillance, video conversation and streaming media transmission, and many well-known video application companies have emerged. In order to ensure the interoperability among codec products from different suppliers, corresponding video coding standards were born.

Due to the existence of various redundant data in digital videos, it is impossible for any single coding tool to achieve efficient video compression alone. The first-generation video coding standard H.261 released in the 1980s uses a hybrid video coding framework that contains a plurality of compression tools used for such as prediction, transformation, quantization, and entropy coding, which can effectively remove temporal, spatial, visual, information entropy and other redundancy to achieve efficient video data compression. Therefore, the hybrid video coding structure has been used to this day by every generation of subsequent video coding standard. The Joint Collaborative Team on Video Coding (JCT-VC) jointly established by the Video Coding Experts Group (VCEG) of the International Telecommunication Union-Telecommunication standardization sector (ITU-T) and the Moving Picture Experts Group (MPEG) of the International Organization for Standardization/International Electrotechnical Commission (ISO/IEC) has released the first version of High Efficiency Video Coding (HEVC) standard in 2013, the compression performance of which has doubled compared with the previous generation standard H.264/AVC. At present, the market share of HEVC is increasing year by year, and some coding optimization methods for HEVC coders have appeared in the past few years.

In video coding, a quantization parameter (QP) and a Lagrange multiplier λ determine the distortion of the coded video and the number of bits required for coding. There is a close relationship between them. The HEVC coder uses a hierarchical coding structure, and the quantization parameter of the coded frame is determined by its position in the Group of Pictures (GOP) and an input quantization parameter $QP_0$ of the coder: $QP_{HM}=QP_0+\Delta QP$. In an HEVC low-delay coding configuration, the GOP size is 4, and values of corresponding $\Delta QP$ are respectively 3, 2, 3 and 1. Then, the Lagrange multiplier used in the coding is calculated based on $QP_{HM}$:

$$\lambda_P = W_L \cdot 2^{((QP_{HM}-12)/3.0)},$$

wherein $W_L$ is a weighting factor related to the level to which the coded frame belongs, and its value takes into account the importance of the rate distortion of coded frames of different levels to an extent. Furthermore, in HEVC's R-λ code rate control algorithm, the Lagrange multiplier of a frame or a Coding Tree Unit (CTU) to be coded is first determined; and then the quantization parameter is calculated based on λ: $QP=4.2005\times\ln(\lambda)+13.7122$.

Under the hybrid video coding framework, predictive coding technology has made a great contribution to efficient video compression of a coder. Intra-frame prediction and inter-frame prediction effectively remove spatial and temporal redundancy in the video data. However, predictive coding also causes generation of great rate distortion dependence between coded frames and between basic coding units, that is, a current coding decision will affect the maximum rate distortion performance that can be achieved in subsequent coding process. Self-adaptive bit resource allocation based on effective utilization of the above rate distortion dependence can further improve compression performance of the coder, and the bit resource allocation can be achieved by adjusting the quantization parameter and the Lagrange multiplier in the coding process.

SUMMARY

The present invention uses rate distortion dependence relationship to optimize allocation of coded bit resources and provides a method for optimizing two-pass coding.

The technical solution of the present invention is as follows:

A method for optimizing two-pass coding comprising the following steps:

S1, setting a start frame of a video sequence as a frame I with a level set to Level 0, which is used as a separate GOP; optimizing the start frame, namely the frame I, specifically setting a quantization parameter $QP_I$ of the frame I according to a range of an input quantization parameter $QP_0$ of a coder:

$$QP_I = \begin{cases} QP_0 - 4, & QP_0 > 34 \\ QP_0 - 3, & 29 < QP_0 \le 34 \\ QP_0 - 2, & 24 < QP_0 \le 29 \\ QP_0 - 1, & 19 < QP_0 \le 24 \\ QP_0, & QP_0 \le 19 \end{cases}$$

S2, reading in a frame to be coded of the GOP by the coder;

S3, first coding: performing first coding on a current frame by using a default quantization parameter $QP_{HM,i}$ set by an HEVC, and obtaining a frame-level temporal impact factor $k_i$ of the current frame and a block-level temporal impact factor $k_{B,j}$ of all the 16×16 pixel blocks in the frame:

$$k_i = \frac{D_i}{D_i^{MCP}}$$

$$k_{B,j} = \frac{D_{B,j}}{D_{B,j}^{MCP}}$$

wherein $D_i$ and $D_i^{MCP}$ are respectively a coding distortion and a motion compensation prediction error of the current frame; and $D_{B,j}$ and $D_{B,j}^{MCP}$ are respectively a coding distortion and a motion compensation prediction error of a jth 16×16 pixel block in the current frame;

S4, restoring reference list information of the coder after the first coding is completed, that is, the first coding does not output a code stream of the current frame or store a reconstructed image; after the coding, resetting a linked image list in the coder to a state before the current frame is coded, including restoring a reference frame identifier in the linked image list;

S5, determining whether a scene is switched, if yes, then going to step S6, if no, then going to step S7; a determination method is: if $p_i > 4\bar{p}$ and $p_i > 10$, it is determined that scene switching occurs in the current frame, wherein $p_i$ is an average motion compensation prediction absolute error of the current frame, and $\bar{p}$ is an a mean value of the average motion compensation prediction absolute error of previous 6 frames;

S6, setting a quantization parameter of the current frame as $QP_i = QP_0$, then performing coding, and outputting the code stream and storing the reconstructed image in a default way of the coder, going to step S8;

S7, setting the quantization parameter of the current frame as $$QP_i = \begin{cases} QP_{HM,i} + \text{Round}(10 \times k_i - 5), & k_i > 0.75 \\ QP_{HM,i}, & \text{else} \end{cases},$$

wherein $QP_{HM,i}$ is the quantization parameter of the current frame set in an original coder, and Round(•) is a rounding operator; if the current frame is a key frame, coding quality loss caused by increasing $QP_i$ will be multiplied due to direct distortion propagation of the key frame to a plurality of subsequent frames, so that the number of bits saved is not sufficient to offset the total loss of coding quality, which may eventually result in a decrease in coding performance, and therefore the current step does not adjust the quantization parameter of the key frame;

after a frame-level Lagrangian multiplier $\lambda_p$ is calculated through $QP_i$, obtaining a Lagrangian multiplier $\lambda_n$ and a quantization parameter $QP_n$ for coding each CTU in the current frame by the following formulas:

$$w_n = \frac{1}{M} \sum_{j=0}^{M} (1 + k_{B,j})$$

$$\bar{w} = \frac{1}{N} \sum_{n=1}^{N} w_n$$

$$W_n = \frac{w_n}{\bar{w}}$$

$$\lambda_n = \frac{\lambda_P}{W_n}$$

$$QP_n = 4.2005 \times \ln(\lambda_n) + 13.7122$$

wherein M is the number of the 16×16 pixel blocks included in an nth CTU, N is the number of the CTUs in a coded frame, $w_n$, $\bar{w}$ and $W_n$ are intermediate variables;

coding each CTU in the current frame by using the calculated Lagrangian multiplier $\lambda_n$ and the quantization parameter $QP_n$, and outputting the code stream and storing the reconstructed image in a default way of the coder;

S8, determining whether the coded frame is the last frame of the video sequence, if yes, then ending the coding; otherwise, continuing to determine whether the coded frame is the last frame in the current GOP, if yes, then going back to step S2, otherwise, going back to step S3.

The differences between the solution of the present invention and the traditional method include: a frame-level temporal influence factor and a block-level temporal influence factor $k_{B,j}$ are proposed to measure rate distortion dependence. A start frame I of a video sequence is optimized. The coding quality of the frame I determines the maximum rate distortion performance that can be reached by subsequent P/B frame coding, and proper improvement of the quality of the frame I can bring a certain improvement of the rate distortion performance for the entire coded video. Since the rate distortion dependence is weak at high code rates and is strong at low code rates, a quantization parameter $QP_I$ of the frame I is provided according to the range of an input quantization parameter $QP_0$ of a coder in the present invention. The frame-level temporal influence factor $k_i$ and the block-level temporal influence factor $k_{B,j}$ are obtained in a simplified coding process. In order to reduce computational complexity, an RDO mode selection process of the first coding skips most of the mode determination steps, and only uses 64×64, 32×32 and 16×16 inter-frame prediction modes. Different optimization strategies are used for coding frames depending on whether a scene is switched.

The beneficial effects of the present invention are:

Rate distortion dependence intensity between the current frame and a reference frame, and importance of each coding block in the current frame for the rate distortion in a subsequent coding process are obtained by means of the simplified first coding, and are then used to guide optimization of a frame-level and a CTU-level coding resources in the two-pass coding. In HEVC coder HM-16.7, in a case where coding complexity is increased by an average of 23%, average code rate savings of 5.1% and 5.3% are respectively achieved in two coding configurations of a low-delay B frame (LDB) and a low-delay P frame (LDP) according to the present invention.

BRIEF DESCRIPTION OF THE DRAWINGS

FIG. 6 is a schematic diagram showing coding time increase and code rate savings of the present invention relative to an HEVC coder.

DETAILED DESCRIPTION OF THE EMBODIMENTS

The present invention will be further described below with reference to the drawings and simulation embodiments, and the effectiveness of the present invention will be pointed out.

Embodiment

This embodiment uses a development environment of Visual Studio 2013 and is implemented based on HEVC reference software HM-16.7.

Figure 1:
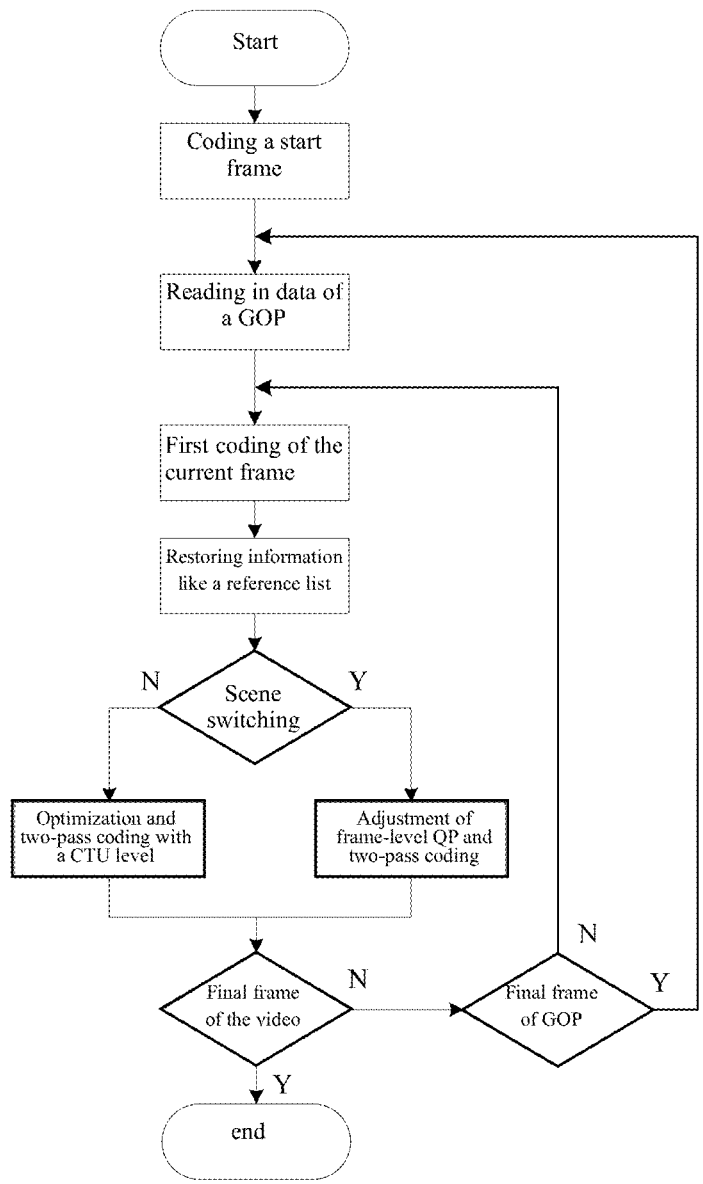
FIG. 1 is a main flowchart according to the present invention.

FIG. 1 is a flowchart of main steps of method for optimizing two-pass coding, specifically including:

S1: optimizing a start frame of a video sequence. Setting a quantization parameter $QP_I$ of a frame I according to a range of an input quantization parameter $QP_0$ of a coder:

$$QP_I = \begin{cases} QP_0 - 4, & QP_0 > 34 \\ QP_0 - 3, & 29 < QP_0 \leq 34 \\ QP_0 - 2, & 24 < QP_0 \leq 29 \\ QP_0 - 1, & 19 < QP_0 \leq 24 \\ QP_0, & QP_0 \leq 19 \end{cases}$$

S2: reading in a frame to be coded of a GOP in a default way of HM-16.7.

S3: performing first coding in a simplified coding process. Performing first coding on a current frame by using a default quantization parameter set by the HEVC and a Lagrange multiplier calculation method, so as to obtain information such as frame-level and 16×16 pixel block-level motion compensation prediction error and coding distortion, and then calculating a frame-level temporal impact factor $k_i$ of the current frame and a block-level temporal impact factor $k_{B,j}$ of all the 16×16 pixel blocks in the frame according to the formula.

S4: restoring information such as a reference list. The first coding does not output a code stream of the current frame or store a reconstructed image; after the coding, resetting a linked image list in the coder to a state before the current frame is coded, including restoring a reference frame identifier in the linked image list.

S5: determining whether a scene is switched, if yes, then going to step S6, if no, then going to step S7. A determination method for scene switching is: if $p_i > 4\bar{p}$ and $p_i > 10$, it is determined that scene switching occurs in the ith frame, wherein $p_i$ is an average motion compensation prediction absolute error of the current frame, and $\bar{p}$ is an mean value of the average motion compensation prediction absolute error of previous 6 frames.

S6: setting a quantization parameter of the current frame as $QP_i = QP_0$, then performing coding, and outputting the code stream and storing the reconstructed image in a default way of the coder.

S7: setting the quantization parameter of the current frame as $$QP_i = \begin{cases} QP_{HM,i} + \text{Round}(10 \times k_i - 5), & k_i > 0.75 \\ QP_{HM,i}, & \text{else} \end{cases}$$

wherein $QP_{HM,i}$ is the quantization parameter of the current frame set in the original HEVC coder HM, and Round(•) is a rounding operator. It should be noted that the above quantization parameter setting only operates on the coded frames of level 2 and 3, and the quantization parameter of the key frame keeps the setting in the original HEVC coder.

After a frame-level Lagrangian multiplier $\lambda_p$ is calculated through $QP_i$, obtaining a Lagrangian multiplier $\lambda_n$ and a quantization parameter $QP_n$ for coding each CTU in the current frame by the following formulas:

$$w_n = \frac{1}{M} \sum_{j=0}^{M} (1 + k_{B,j})$$

$$w = \frac{1}{N} \sum_{n=1}^{N} w_n$$

$$W_n = \frac{w_n}{w}$$

$$\lambda_n = \frac{\lambda_P}{W_n}$$

$$QP_n = 4.2005 \times \ln(\lambda_n) + 13.7122$$

wherein M is the number of the 16×16 pixel blocks included in an nth CTU, N is the number of the CTUs in a coded frame. Eventually, for a case where scene switching does not occur, coding each CTU in the current frame by using the above calculated Lagrangian multiplier $\lambda_n$ and quantization parameter $QP_n$, and outputting the code stream and storing the reconstructed image in a default way of the coder.

S8, determining whether the coded frame is the last frame of the video sequence. If "yes", then ending the coding; if "no", continuing to determine whether the coded frame is the last frame in the current GOP. If "yes", skipping to step S2 to read the next GOP data; if "no", skipping to step S3 to code the next frame in the current GOP.

Figure 2:
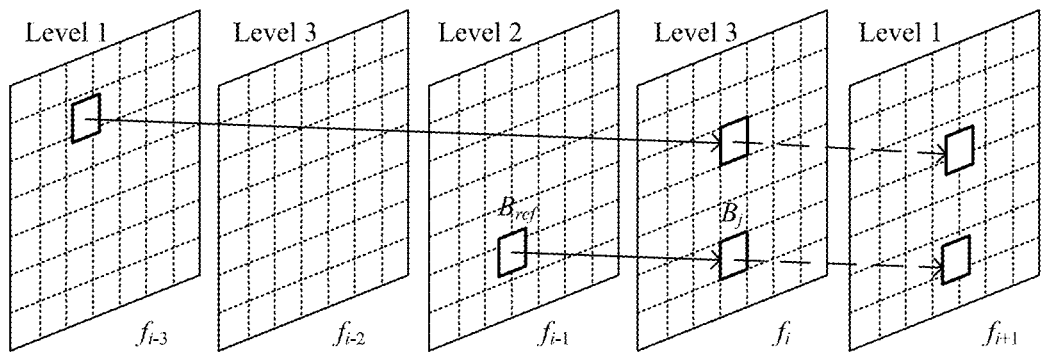
FIG. 2 is a schematic diagram of an example of reference relationship in HEVC low-delay coding.
Figure 3:
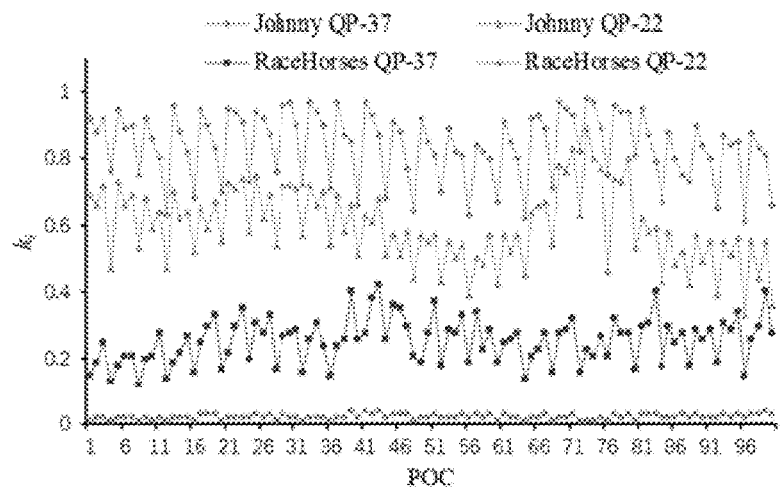
FIG. 3 is a statistical diagram of a frame-level temporal impact factor $k_i$ according to the present invention.
Figure 4:
FIG. 4 is a schematic diagram of an example of a block-level temporal impact factor $k_{B,j}$ that can be visualized in video.

The bit stream generated by coding according to the present invention conforms to the syntax format of the HEVC standard, and all generated bit streams can be decoded by a standard HEVC decoder. Coding experiments were conducted according to HEVC general test conditions, and two coder configurations, LDB and LDP, were tested, the reference relationship of which is shown in FIG. 2. It can be seen from FIGS. 3 and 4 that the frame-level temporal impact factor $k_i$ and the block-level temporal impact factor $k_{B,j}$ proposed by the present invention effectively represent the rate distortion dependence.

Figure 5:
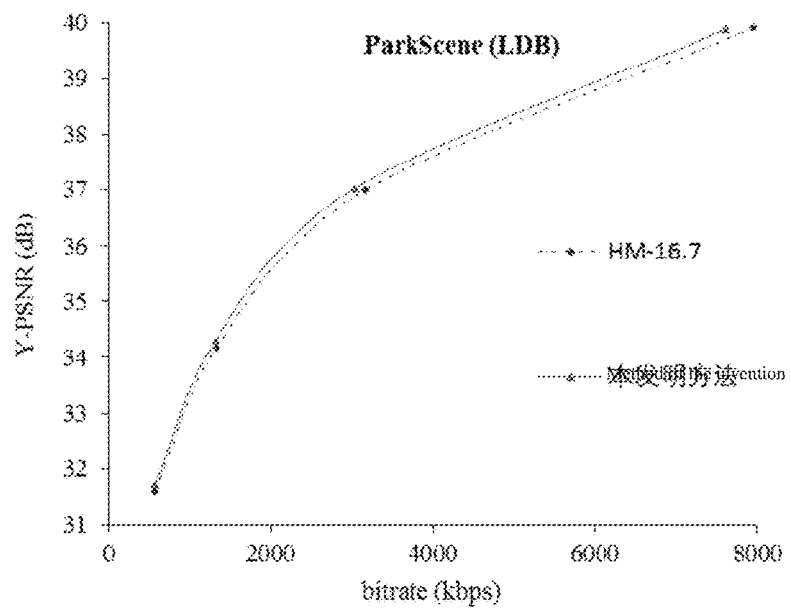
FIG. 5 is a schematic diagram of comparison of rate distortion curves.

FIG. 5 shows a comparison of rate distortion curves of a test sequence PartyScene in coding configurations of LDB and LDP. It can be seen that the rate distortion performance at both low and high code rates according to the present invention is superior to the original HEVC coder HM-16.7.

FIG. 6 is a schematic diagram showing coding time increase and code rate savings of the present invention relative to an original HEVC coder HM-16.7. It can be seen that in a case where coding complexity is increased by an average of 23%, average code rate savings of 5.1% and 5.3% are respectively obtained in coding configurations of LDB and LDP according to the present invention, showing remarkable rate distortion performance improvement.

What is claimed is:

1. A method for optimizing a two-pass coding, comprising the following steps:

S1: setting a start frame of a video sequence as a frame I with a level set to Level 0, wherein the frame I is used as a separate Group of Pictures (GOP); optimizing the start frame, wherein the start frame is the frame I, setting a quantization parameter $QP_I$ of the frame I according to a range of an input quantization parameter $QP_0$ of a coder:

$$QP_I = \begin{cases} QP_0 - 4, & QP_0 > 34 \\ QP_0 - 3, & 29 < QP_0 \leq 34 \\ QP_0 - 2, & 24 < QP_0 \leq 29; \\ QP_0 - 1, & 19 < QP_0 \leq 24 \\ QP_0, & QP_0 \leq 19 \end{cases}$$

S2: reading in a frame to be coded of the GOP by the coder;

S3: a first coding: performing the first coding on a current frame by using a default quantization parameter $QP_{HM,i}$ set by an High efficiency video coding (HEVC), and obtaining a frame-level temporal impact factor $k_i$ of the current frame and a block-level temporal impact factor $k_{B,j}$ of 16×16 pixel blocks in the current frame:

$$k_i = \frac{D_i}{D_i^{MCP}};$$

$$k_{B,j} = \frac{D_{B,j}}{D_{B,j}^{MCP}};$$

wherein $D_i$ and $D_i^{MCP}$ are respectively a coding distortion and a motion compensation prediction error of the current frame; and $D_{B,j}$ and $D_{B,j}^{MCP}$ are respectively a coding distortion and a motion compensation prediction error of a jth 16×16 pixel blocks in the current frame;

S4: restoring reference list information of the coder after the first coding is completed, wherein the first coding does not output a code stream of the current frame or store a reconstructed image; after the first coding, resetting a linked image list in the coder to a state before the current frame is coded, comprising restoring a reference frame identifier in the linked image list;

S5: determining whether a scene is switched, if the scene is switched, performing step S6, if the scene is not switched, performing step S7; a determination method is: if $p_i > 4\bar{p}$ and $p_i > 10$, a scene switching occurs in the current frame, wherein $p_i$ is an average motion compensation prediction absolute error of the current frame, and $\bar{p}$ is an a mean value of the average motion compensation prediction absolute error of previous six frames;

S6: setting a quantization parameter of the current frame as $QP_i = QP_0$, then performing the two-pass coding, and outputting the code stream and storing the reconstructed image in a default way of the coder, entering step S8;

S7: setting the quantization parameter of the current frame as $$QP_i = \begin{cases} QP_{HM,i} + \text{Round}(10 \times k_i - 5), & k_i > 0.75 \\ QP_{HM,i}, & \text{else} \end{cases},$$

wherein $QP_{HM,i}$ is the quantization parameter of the current frame set in an original coder, and Round(•) is a rounding operator;

after a frame-level Lagrangian multiplier $\lambda_p$ is calculated through $QP_i$, obtaining a Lagrangian multiplier $\lambda_n$ and a quantization parameter $QP_n$ for coding each Coding tree unit (CTU) of the CTUs in the current frame by the following formulas:

$$w_n = \frac{1}{M} \sum_{j=0}^{M} (1 + k_{B,j});$$

$$\bar{w} = \frac{1}{N} \sum_{n=1}^{N} w_n;$$

$$W_n = \frac{w_n}{\bar{w}};$$

$$\lambda_n = \frac{\lambda_p}{W_n};$$

$$QP_n = 4.2005 \times \ln(\lambda_n) + 13.7122;$$

wherein M is a number of the 16×16 pixel blocks comprised in an nth CTU of the CTUs, N is a number of the CTUs in a coded frame, $w_n$, $\bar{w}$ and $W_n$ are intermediate variables;

coding the each CTU in the current frame by using the Lagrangian multiplier $\lambda_n$ and the quantization parameter $QP_n$, and outputting the code stream and storing the reconstructed image in the default way of the coder;

S8: determining whether the coded frame is a last frame of the video sequence, if the coded frame is the last frame of the video sequence, then ending the two-pass coding; if the coded frame is not the last frame of the video sequence, continuing to determine whether the coded frame is the last frame in a current GOP, if the coded frame is the last frame in the current GOP, then performing step S2, if the coded frame is not the last frame in the current GOP, performing step S3.

* * * * *